United States Patent [19]
Jinno et al.

[11] Patent Number: 5,948,031
[45] Date of Patent: *Sep. 7, 1999

[54] VEHICLE PASSENGER SENSING SYSTEM AND METHOD

[75] Inventors: Kazunori Jinno, Morrow, Ga.; Saikichi Sekido, Tokyo, Japan; Philip H. Rittmueller, St. Charles, Ill.

[73] Assignee: NEC Technologies, Inc., Itasca, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/606,175

[22] Filed: Feb. 23, 1996

[51] Int. Cl.$^6$ .................................................. B60R 21/00
[52] U.S. Cl. ............................................. 701/45; 280/735
[58] Field of Search .................... 364/424.055, 424.056, 364/424.057; 280/732, 735, 734; 340/457.1; 701/45, 46, 47; 180/268, 271, 272

[56] References Cited

U.S. PATENT DOCUMENTS

| | | |
|---|---|---|
| 3,219,925 | 11/1965 | Borley et al. . |
| 3,732,538 | 5/1973 | Gillund et al. ........................ 340/457.1 |
| 3,740,567 | 6/1973 | Atkins ................................. 307/10 SB |
| 3,781,672 | 12/1973 | Maltby et al. . |
| 3,843,924 | 10/1974 | Wahlgren . |
| 3,863,209 | 1/1975 | Hollins ................................... 340/52 E |
| 4,136,291 | 1/1979 | Waldron . |
| 4,614,937 | 9/1986 | Poujois . |
| 4,688,141 | 8/1987 | Bernard et al. . |
| 4,700,973 | 10/1987 | Gademann et al. ..................... 280/735 |
| 4,796,013 | 1/1989 | Yasuda et al. ........................... 340/562 |
| 4,885,566 | 12/1989 | Aoki et al. ............................ 340/457.1 |
| 4,887,024 | 12/1989 | Sugiyama et al. . |
| 4,958,129 | 9/1990 | Poduje et al. . |
| 4,972,154 | 11/1990 | Bechtel et al. . |
| 4,980,519 | 12/1990 | Matthrews . |
| 5,002,308 | 3/1991 | Lenzen et al. .......................... 280/735 |
| 5,071,160 | 12/1991 | White et al. ............................ 280/735 |
| 5,074,583 | 12/1991 | Fujita et al. ............................ 280/735 |
| 5,087,825 | 2/1992 | Ingraham . |

(List continued on next page.)

FOREIGN PATENT DOCUMENTS

| | | |
|---|---|---|
| 60025475 | 8/1985 | European Pat. Off. . |
| 63094102 | 4/1988 | European Pat. Off. . |
| 63241402 | 6/1988 | European Pat. Off. . |
| 0 302 727 A2 | 8/1989 | European Pat. Off. . |
| WO 90/16045 | 12/1990 | European Pat. Off. . |
| 0 441 381 A1 | 8/1991 | European Pat. Off. . |
| WO 92/09063 | 5/1992 | European Pat. Off. . |
| 0 609 021 A2 | 3/1994 | European Pat. Off. . |
| WO 94/23974 | 10/1994 | European Pat. Off. . |
| WO 95/21752 | 8/1995 | European Pat. Off. . |
| WO 96/09193 | 3/1996 | European Pat. Off. . |
| WO 96/36134 | 11/1996 | European Pat. Off. . |
| WO 97/31238 | 8/1997 | European Pat. Off. . |
| 44 17 827 A 1 | 11/1995 | Germany . |
| 1573582 | 8/1980 | United Kingdom . |

OTHER PUBLICATIONS

Thomas G. Zimmerman, et al. "Applying Electric Field Sensing To Human–Computer Interfaces" (8 pages) (Oct. 6,1994).

Leonard M. Magid, "Electromagnetic Fields, Energy, And Waves" (2 pages) (1972).

*Primary Examiner*—William A. Cuchlinski, Jr.
*Assistant Examiner*—Edward J. Pipala
*Attorney, Agent, or Firm*—Brinks Hofer Gilson & Lione

[57] ABSTRACT

A vehicle passenger sensing system and method in which the presence and position of a passenger is determined by transmitting an electric field from a first electrode and measuring currents induced by the electric field in a plurality of receiver electrodes. The induced currents at the various receiver electrodes are then compared to determine the presence of an adult size passenger, to distinguish between front-facing and rear-facing child safety seats, and to detect when a passenger is out of position. A switching circuit is provided to selectively transmit the electric field from each of the plurality of electrodes.

20 Claims, 8 Drawing Sheets

U.S. PATENT DOCUMENTS

| | | |
|---|---|---|
| 5,130,672 | 7/1992 | Watkiss et al. . |
| 5,134,379 | 7/1992 | Maher et al. . |
| 5,161,820 | 11/1992 | Vollmer ................................. 280/730 |
| 5,166,679 | 11/1992 | Vranish et al. . |
| 5,189,417 | 2/1993 | Caldwell et al. . |
| 5,214,388 | 5/1993 | Vranish et al. . |
| 5,225,959 | 7/1993 | Stearns . |
| 5,232,243 | 8/1993 | Blackburn et al. .................. 280/732 |
| 5,247,261 | 9/1993 | Gershenfeld . |
| 5,247,281 | 9/1993 | Facon et al. . |
| 5,305,017 | 4/1994 | Gerpheide . |
| 5,330,226 | 7/1994 | Gentry et al. ........................ 280/735 |
| 5,366,241 | 11/1994 | Kithil ................................... 280/735 |
| 5,400,487 | 3/1995 | Gioutsos et al. ..................... 280/735 |
| 5,404,128 | 4/1995 | Ogino et al. ........................ 340/425.5 |
| 5,413,378 | 5/1995 | Steffens, Jr. et al. . |
| 5,431,438 | 7/1995 | Manabe ................................ 280/731 |
| 5,432,671 | 7/1995 | Allavena . |
| 5,439,249 | 8/1995 | Steffen, Jr. et al. ................. 280/735 |
| 5,446,661 | 8/1995 | Gioutsos et al. ................... 364/424.05 |
| 5,463,388 | 10/1995 | Boie et al. . |
| 5,482,314 | 1/1996 | Corrado et al. ...................... 280/735 |
| 5,494,311 | 2/1996 | Blackburn et al. ................... 280/735 |
| 5,525,843 | 6/1996 | Höwing ................................ 307/9.1 |
| 5,602,734 | 2/1997 | Kithil ................................ 364/424.055 |

OTHER PUBLICATIONS

"Musical Applications of Electric Field Sensing", Joseph A. Paradiso and Neil Gershenfeld, *MIT Media Laboratory*, Draft 1.7, Oct., 1995.

VEHICLE PASSENGER SENSING SYSTEM AND METHOD

BACKGROUND OF THE INVENTION

1. Field of the Invention

The present invention generally relates to vehicle passenger restraint systems, and in particular to a passenger sensing system for detecting the presence and position of passengers within a vehicle.

2. Description of the Prior Art

Since their introduction in the late 1980's airbags have saved lives and reduced the severity of countless injuries resulting from automobile accidents. However, airbags have also taken lives and caused injuries to very young children when the force of a deploying airbag struck a rear-facing child safety seat. In response to these tragic events, the National Transportation Safety Board (NTSB) issued a recommendation to the automotive industry to develop "smart" passenger restraint systems which can detect a rear-facing child safety seat and automatically deactivate adjacent airbags. The present invention is provided in response to the NTSB's recommendation.

Several passenger sensing systems are currently known. A first sensing system em ploys a load-dependant switch is mounted under the seat cushion of a vehicle seat. When the seat is occupied by an object of sufficient weight, the switch is activated to arm the passenger restraint system. However, a disadvantage of this system is that it cannot distinguish between, for example, an occupied child safety seat and a small passenger. Such a system is disclosed in U.S. Pat. No. 3,863,209.

A second passenger sensing system uses optical or ultrasonic transmitters and sensors to detect the position and motion of a passenger. However, the optical and ultrasonic transmitters and sensors are expensive and difficult to install properly within a vehicle cabin. Such a system is disclosed in U.S. Pat. No. 5,446,661.

A third type of passenger sensing system utilizes a pair of electrodes mounted on a vehicle seat to detect a passenger. With this system, the presence or absence of a passenger changes the capacitance between the electrodes. The electrodes are connected to a variable oscillator circuit whose frequency is changed in response to the electrode capacitance. By measuring the frequency of the variable oscillator circuit and comparing the measured frequency with a threshold value, the presence or absence of the passenger is determined. The threshold value is selected such that a passenger restraint system is activated when the detected passenger is larger than a predetermined size, and is de-activated when the detected passenger is smaller than the predetermined size. This capacitive passenger sensing system is disclosed in PCT Application No. WO 95/21752.

A problem with the foregoing variable oscillator passenger sensing system is that airbags are de-activated even in "safe" situations, such as when a forward-facing child safety seat is used.

Further, with this variable oscillator sensing method, the effect of an object on the capacitance between the electrodes is substantially independent of its orientation. Therefore, it is difficult to use this method to distinguish between, for example, a child riding in a front-facing child seat and a child riding in a rear-facing child seat. That is, a child will produce the same variable oscillator frequency whether the child is riding in a rear-facing child safety seat or in a forward-facing child safety seat.

In view of the shortcomings of the prior art passenger sensing systems, what is needed is an economical passenger sensing system and method which can distinguish between a front-facing child seat and a rear-facing child seat.

SUMMARY OF THE INVENTION

In accordance with the present invention, a vehicle passenger sensing system is disclosed in which the presence and position of a passenger is determined by transmitting an electric field signal from a transmitter electrode and measuring the resulting currents at a plurality of receiver electrodes. The magnitude of the receiver current is affected by the presence of a passenger in the "path" between the transmitter and receiver electrodes. By measuring and comparing the receiver currents at a plurality of receiver electrodes, it is possible to distinguish between front-facing and rear-facing child safety seats, thereby providing "smart" control of a passenger restraint system.

In accordance with a first embodiment of the present invention, first and second electrodes are mounted on a base portion of a vehicle seat, the first electrode being connected to a signal source such that an electric field signal is generated in the vicinity of the seat. A third electrode is mounted on a back support portion of the seat. The electric field produces receiver currents at the second and third electrodes, which are amplified, measured and compared. When the magnitudes of the measured receiver currents indicate the presence of a rear-facing child safety seat, the passenger sensing system generates command signals which are used by a passenger restraint system to, for example, de-activate an airbag located adjacent the safety seat such that the airbag does not deploy in the event of a collision. When the magnitudes of the measured electric fields indicate the presence of an adult passenger or a front-facing child safety seat, the passenger restraint system is controlled to activate the airbag.

In accordance with another aspect of the first embodiment, the first (transmitter) electrode includes a pair of metal layers separated by an insulating layer, one metal layer being connected to a signal generator and the other metal layer being electrically isolated (floating). Further, the second and third (receiver) electrodes each include metal layers separated by an insulation layer, one metal layer being connected to the controller, and the other metal layer being connected to a predetermined voltage source (such as ground).

In accordance with a second embodiment of the present invention, a plurality of electrodes mounted on a vehicle seat and connected to a switching circuit. The switching circuit connects a selected electrode to a signal generator such that the selected electrode generates an electric field. The switching circuit also connects a first set of the remaining electrodes to a controller for determining the magnitudes of the electric field at these electrodes. Subsequently, the switching circuit connects another electrode to the signal source and measures the resulting electric field magnitudes at a second set of electrodes. This process is continued in a cycle such that all of the electrodes are used as the transmitter electrodes. The passenger restraint system is activated by the controller when the magnitudes of the electric fields measured during the cycle meet predetermined criteria.

A method for sensing a passenger in a vehicle seat in accordance with the present invention includes transmitting an electric field from a first location on the seat, detecting and measuring strengths of the electric field at two or more locations on the seat, then comparing the measured strengths to determine the presence and position of a passenger.

BRIEF DESCRIPTION OF THE DRAWINGS

These and other aspects of the present invention are described in greater detail in the following description which references the appended drawings, in which.

DESCRIPTION OF THE PREFERRED EMBODIMENT

Figure 1:
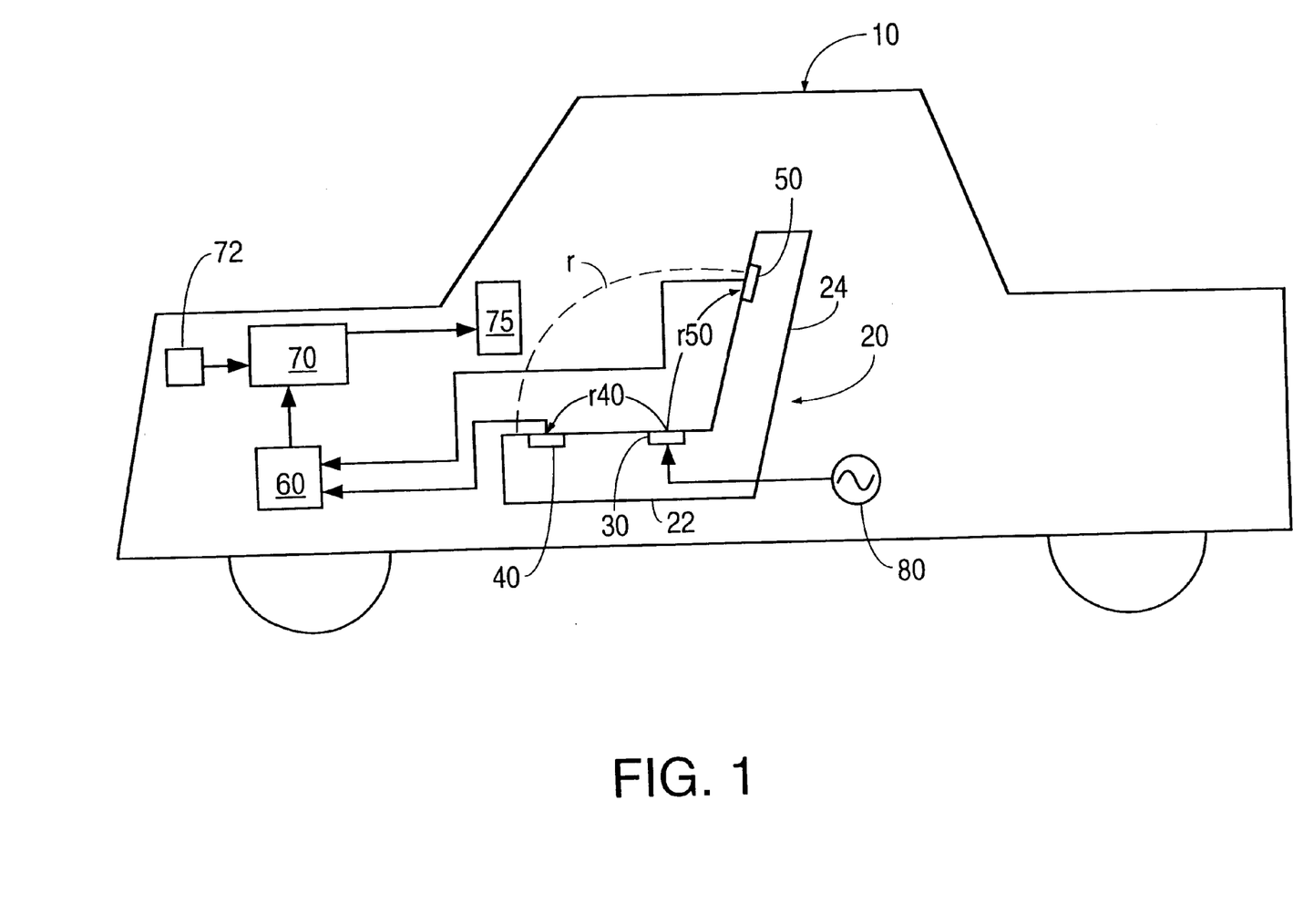
FIG. 1 shows a diagram of a passenger sensing system in accordance with a first embodiment of the present invention.

Referring to FIG. 1, a passenger sensing/restraint system in accordance with a first embodiment of the present invention is shown in association with a vehicle 10. Although the shape of the vehicle 10 may suggest an automobile, the passenger sensing/restraint system of the present invention may also be incorporated into any type of passenger vehicle, including buses, aircraft and boats.

The vehicle 10 includes a seat 20 which is attached to the vehicle 10 using known techniques. The seat 20 includes a base portion 22 and a back support portion 24. A transmitter electrode 30 and a first receiver electrode 40 are mounted on the base portion 22, with the transmitter electrode 30 being positioned between the receiver electrode 40 and the back support portion 24. A second receiver electrode 50 is mounted on the back support portion 24.

The transmitter electrode 30 generates an electric field r in response to a signal received from a signal source 80 (preferably 50 to 100 kHz). For explanatory purposes, the electric field r is represented in FIG. 1 with a semi-circular dashed line located over the seat 20—the electric field r is more accurately described as a substantially semi-spherical area located over the transmitter electrode 30.

Electric field "current paths" (indicated as lines r40 and r50 in FIG. 1) extend from transmitter electrode 30 to the receiver electrodes 40 and 50, respectively. In the following description, the current path designations identify the receiver electrode at which a current is measured in response to the electric field signal generated by a transmitter electrode. For example, in FIG. 1, path r40 represents the current at electrode 40 produced in response to an electric field transmitted from electrode 30.

The magnitudes of the receiver currents at the receiver electrodes 40 and 50 are inversely proportional to their distance from the transmitter electrode 30, and are proportional to the area of the electrodes (antennae), the transmission frequency and the signal power. Further, the extent to which a passenger is located in the current paths r40 and r50 effects the magnitudes of the receiver currents. For example, when an adult passenger is sitting on the transmitter electrode 30 and receiver electrode 40, and leaning against the receiver electrode 50, then the receiver currents r40 and r50 are typically at or near a maximum value. However, when a passenger is positioned away from the transmitter electrode 30 but within the current path (such as a child in a child safety seat), the passenger tends to have less of an effect on the electric field such that the receiver current is less than the maximum value, but greater than an "empty seat" value.

In accordance with the present invention, the receiver currents at the receivers 40 and 50 are measured and compared with stored information to distinguish between a normally-seated passenger (typically indicated by maximum current values) and a child riding in child safety seat (typically indicated by intermediate current values). Further, by comparing intermediate current values for current paths r40 and r50 using predetermined criteria, the present invention provides a method for distinguishing between front-facing and rear-facing child safety seats. For example, when a child is riding in a rear-facing child seat, the child's body is typically parallel to the base portion 22 of the seat 20 (see FIG. 1). This arrangement produces a relatively higher current on path r40 in comparison to the current on path r50. Conversely, a child in a forward facing child seat produces a relatively higher current on path r50 in comparison to the current on path r40. By comparing the measured currents, it is possible to determine the type of child safety seat being used. When a rear-facing child safety seat is detected, the passenger restraint system de-activates adjacent airbags.

FIGS. 2(A), 2(B), 3(A) and 3(B) disclose preferred electrodes for use in the passenger sensing system according to the first embodiment.

Figure 2A:
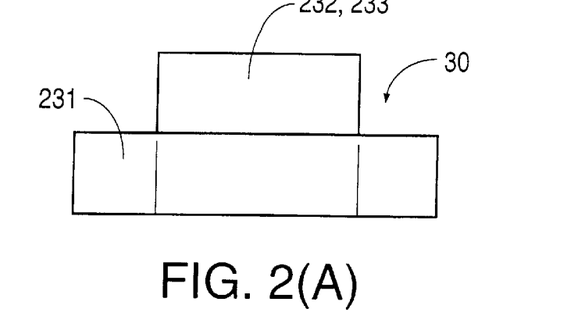
FIGS. 2(A) and 2(B) respectively show plan and side section views of a transmitter electrode used in accordance with the present invention.
Figure 2B:
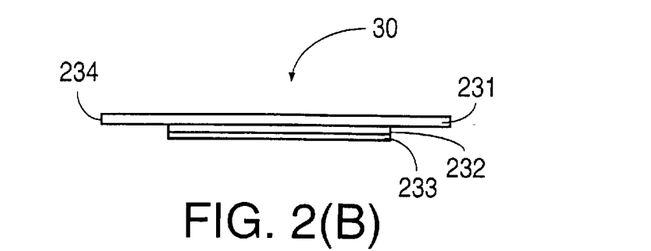

FIGS. 2(A) and 2(B) respectively show plan and side section views of the transmitter electrode 30. The transmitter electrode 30 includes an upper metal layer 231 (preferably copper foil) formed over an insulating layer 232 (preferably a sheet of 0.254 mm thick FR4). A lower metal layer 233 (preferably 0.254 mm thick copper) is formed on a bottom surface of the insulating layer 232. The upper metal layer 231 is approximately 400 mm by 50 mm, and the insulating layer 232 and lower metal layer 233 are approximately 200 mm by 110 mm.

The stability of the electric field generated by the transmission electrode 30 depends on the ground plane and the transmission frequency. With the disclosed electrode, the preferred transmission frequency is 100 kHz.

Figure 3A:
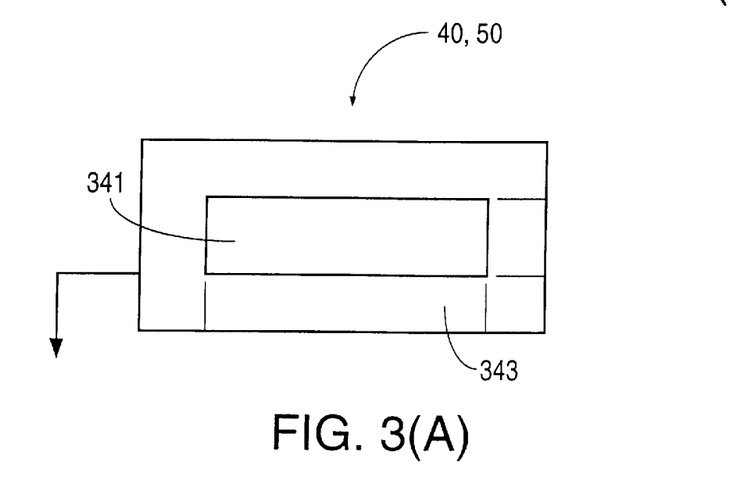
FIGS. 3(A) and 3(B) respectively show plan and side section views of a receiver electrode used in accordance with the present invention.
Figure 3B:
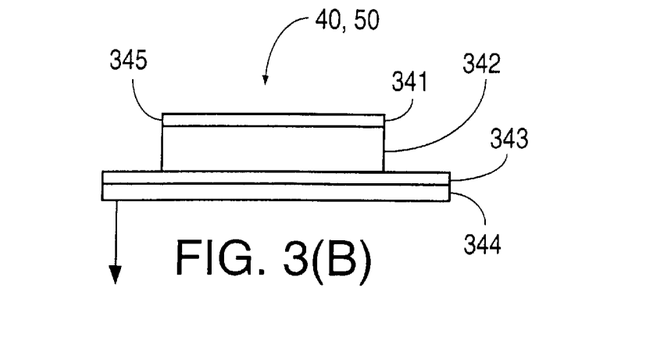

FIGS. 3(A) and 3(B) respectively show plan and side section views of the receiver electrode 40. The receiver electrode 40 includes an upper metal layer 341 (preferably copper foil) formed over an upper insulating layer 342. The upper insulating layer 342 is formed over a lower insulating layer 343 (preferably a sheet of 0.254 mm thick FR4) and a lower metal layer 344 (preferably 0.254 mm thick copper). The upper metal layer 341 and upper insulating layer 342 are approximately 300 mm by 50 mm wide, and the insulating layer 342 and lower metal layer 344 are approximately 350 mm long and 110 mm wide.

The lower metal layer 344 forms a ground plane which stabilizes, but weakens, the received signal. When a high transmission frequency is used, a low ground plane impedance is necessary. Therefore, it is necessary to modify the ground plane with a material having a low dielectric constant. The above-mentioned upper insulating layer 342 is therefore provided to reduce the weakening effect of the ground plane. The upper insulating layer 342 is preferably 10 mm thick silicon rubber, but can also be another dielectric material such as plexiglass, Teflon or polyamide.

Figure 4:
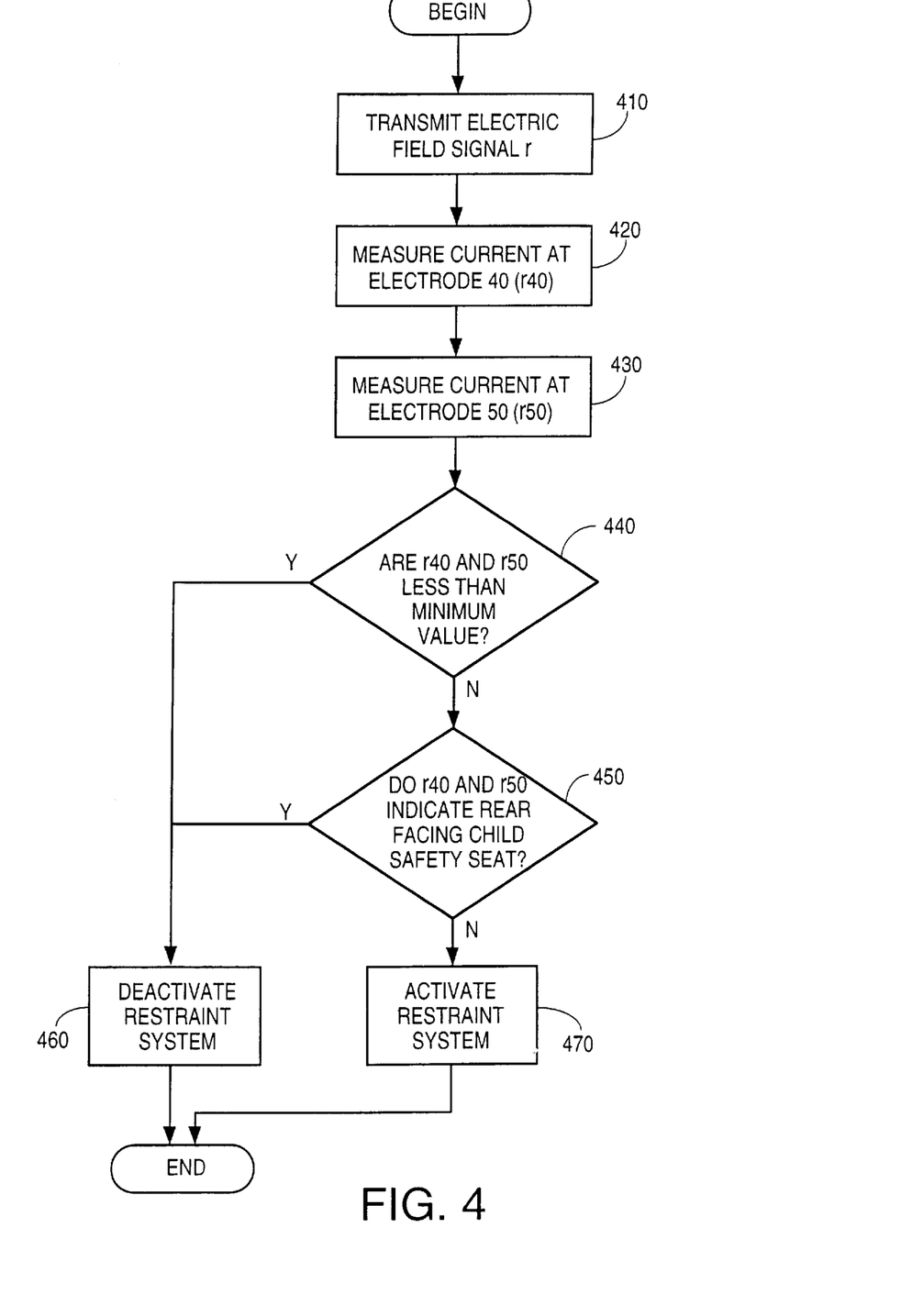
FIG. 4 shows a method for detecting the presence of a passenger in accordance with the first embodiment.

FIG. 4 shows a basic flow diagram illustrating a method for determining the presence of a passenger in accordance with the first embodiment of the present invention.

In initial step 410, transmitter electrode 30 transmits the electric field r. During transmission, signals from the signal source 80 (see FIG. 1) are applied to the upper metal layer 231 through a lead 234 (see FIGS. 2(A) and 2(B)). The lower metal layer 233 is allowed to float. With this arrangement, the electric field generated by transmitter electrode 30 is substantially located above the upper metal layer 231.

In step 420, a magnitude of the electric field along path r40 causes current to flow in the upper metal layer 341 of the receiver electrode 40 (see FIGS. 3(A) and 3(B)). These currents are transmitted through a lead 345 (and preferably via an amplifier, not shown) to the controller 60.

Likewise, in step 430, a magnitude of the electric field along path r40 causes a current in the receiver electrode 50. This current is transmitted from receiver electrode 50 to controller 60.

In step 440, the currents associated with paths r40 and r50 are compared with preset minimum values. If the measured currents from paths r40 and r50 are below the minimum values (indicating an unoccupied seat), then the controller 60 generates a "de-activate" command signal (step 460). If the measured strengths are greater than the minimum values, then, in step 450, the currents from paths r40 and r50 are compared. If the comparison indicates a rear-facing child safety seat (for example, when the measured current on path r50 is less than the measured current on path r40), then the controller 60 generates a "de-activate" command signal (step 460). Conversely, if the measured current on path r50 is greater than or equal to the current on path r40, the controller 60 generates an "activate" command signal.

Referring again to FIG. 1, in accordance with the present invention, the "activate" and "de-activate" command signals generated by the controller 60 are transmitted to a passenger restraint controller 70. In response to the "activate" command signal, the passenger restraint controller 70 activates an airbag 75 in response to a collision signal received, for example, from a collision detector 72. In response to the "de-activate" command signal, the passenger restraint controller 70 ignores collision signals, thereby preventing activation of the airbag 75 in response to a collision signal.

The present invention is not limited to the specific structure described above in the first embodiment. For example, although the transmitter electrode 30 is shown in FIG. 1 as mounted on the seat portion 22, the transmitter electrode 30 may be mounted on the back support portion 24 of the seat 20. Additional variations of the present invention are discussed in the following embodiments.

Figure 5:
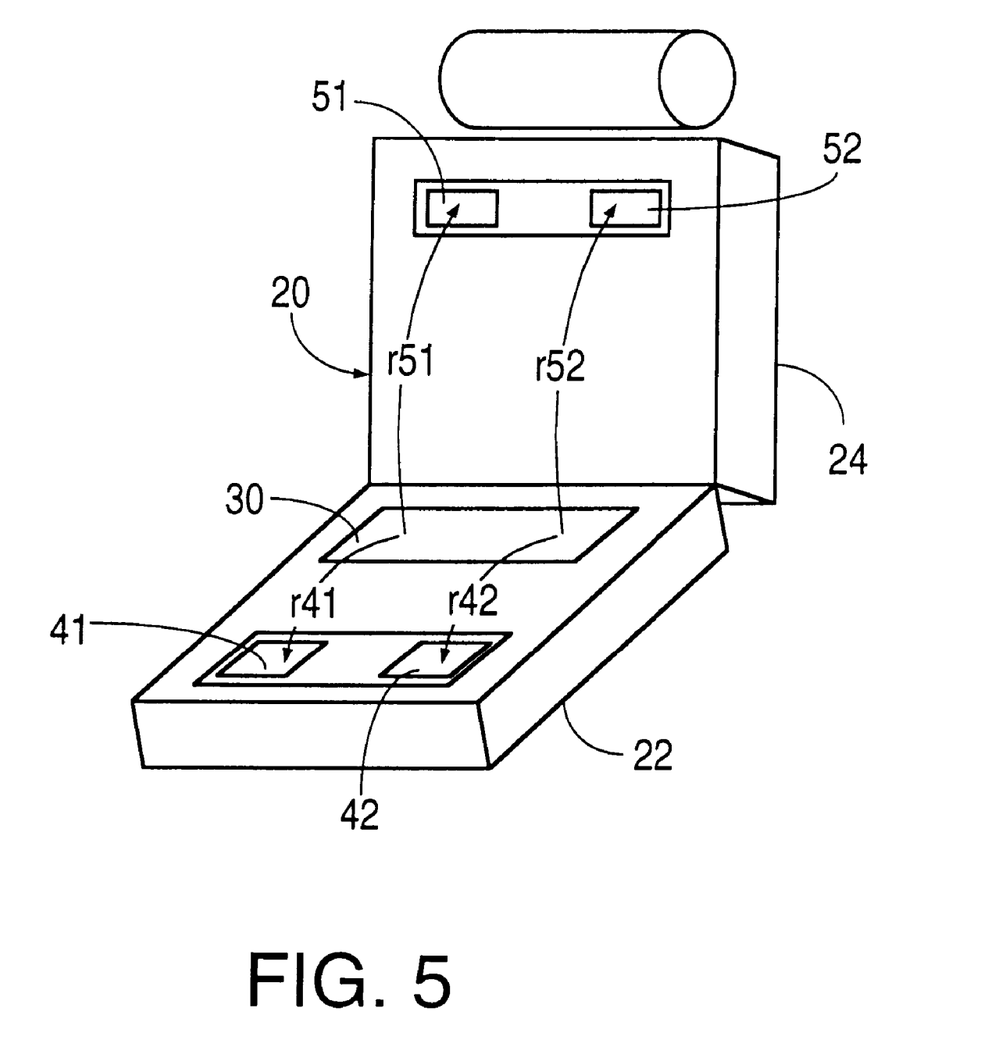
FIG. 5 shows a simplified circuit diagram of a passenger sensing system in accordance with a second embodiment of the present invention.

FIG. 5 shows a second embodiment of the present invention in which receiver electrodes 41 and 42 are mounted on the base portion 22, and receiver electrodes 51 and 52 are mounted on the back support portion 24 of the seat 20. As in the first embodiment, the transmitter electrode 30 is connected to a signal source (not shown). Likewise, the four receiver electrodes 41, 42, 51 and 52 are connected to a controller (not shown). Current paths r41, r42, r51 and r52 are formed between the transmitter 30 and the corresponding receiver electrodes 41, 42, 51 and 52.

Figure 6:
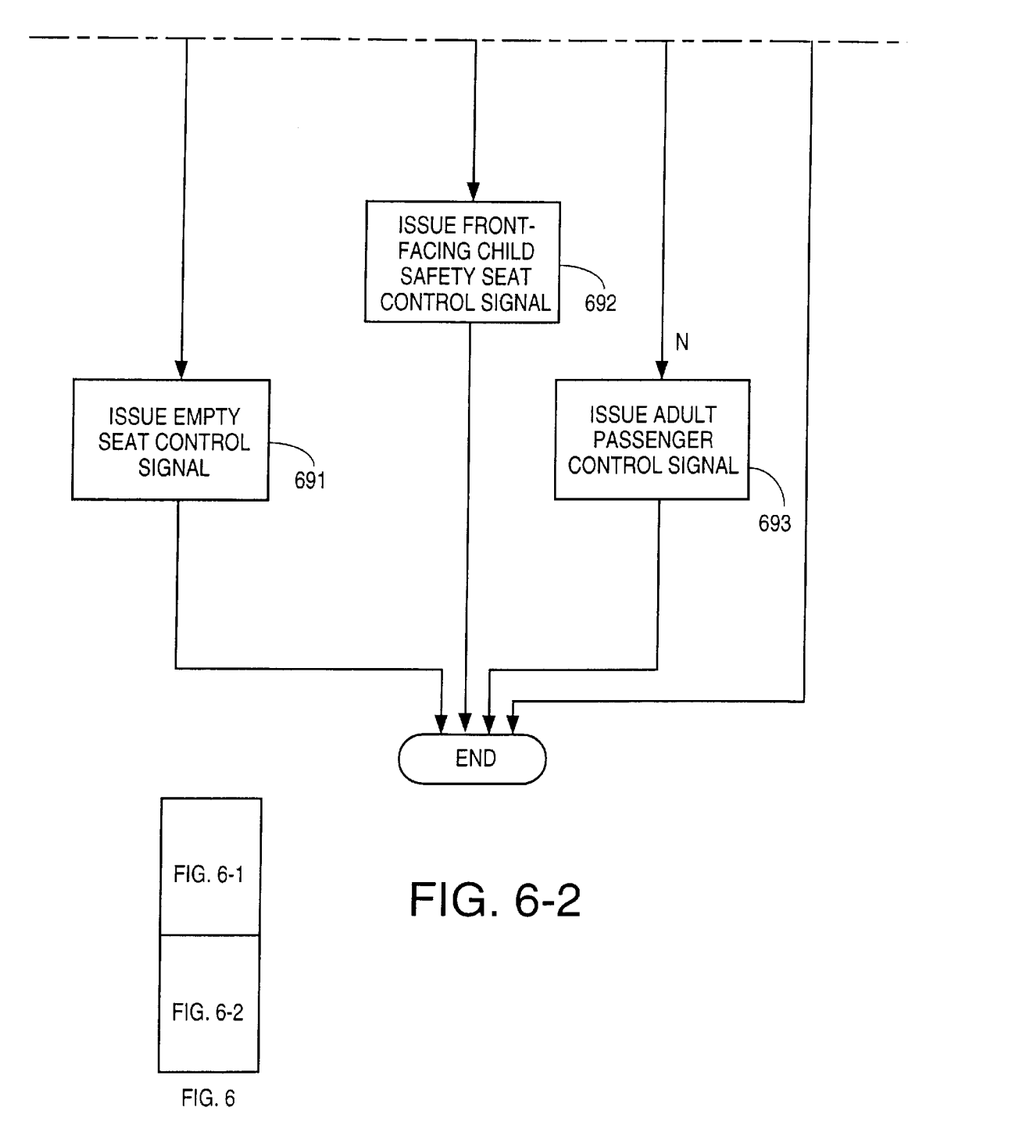
FIG. 6 shows a method for detecting the presence of a passenger in accordance with the second embodiment.

FIG. 6 shows a diagram indicating a method for detecting the presence of a passenger in accordance with the passenger sensing system shown in FIG. 5. The steps described below are not necessarily restricted to the order in which they appear.

First, in step 610, signal paths r41, r42, r51 and r52 are initialized. The currents at receiver electrodes 41, 42, 51 and 52 (represented by signal paths r41, r42, r51 and r52) are then transmitted to the controller 60 through an amplifier (not shown). The controller converts the analog current signals into, for example, eight bit digital signals (having a value from 0 to 255) which indicates the current strength.

In step 620, a value A is calculated in the controller 60. Value A is equal to the measured currents on the paths according to the equation $(r41+r42)/2-(r51+r52)/2$.

In step 630, the value A is compared with a first predetermined value $\alpha 1$. Predetermined value $\alpha 1$ is determined from experimental data and stored in memory associated with the controller 60. Predetermined value $\alpha 1$ indicates an expected minimum difference between the currents received by base portion electrodes 41 and 42 (see FIG. 5) and back support electrodes 51 and 52 which indicate an occupied rear-facing child safety seat. That is, if A is greater than $\alpha 1$, then the presence of an occupied rear-facing child safety seat is possible, and control passes to step 640. Conversely, if A is less than $\alpha 1$, then the presence of an occupied rear-facing child safety seat is not possible, and control passes to step 650.

Step 640 determines whether the absolute value of r41–r42 is less than a second predetermined value $\beta 1$. Predetermined value $\beta 1$ is also experimentally determined, and represents a minimum expected difference between the currents at electrodes 41 and 42 in the presence of a child. That is, step 640 is provided to distinguish between the presence of a child and the presence of a small object, such as a purse, which is placed on the seat. If the absolute value of r41–r42 is less than $\beta 1$, then the passenger sensing system determines that a substantial mass (such as a child) is located adjacent the electrodes 41 and 42, and control passes to step 660. If the absolute value of r41–r42 is greater than $\beta 1$, then the passenger sensing system determines that a small object is present, and issues an "empty seat" command signal to the passenger restraint system (step 691).

In step 650, the value A is compared with a third predetermined value $\alpha 2$. Similar to the use of value $\alpha 1$, experimentally determined value $\alpha 2$ indicates an expected difference between the currents received by base support portion electrodes 41 and 42 and back support electrodes 51 and 52 which indicate an occupied front-facing child safety seat. That is, if A is less than $\alpha 2$, then the presence of an occupied front-facing child safety seat is possible, and control passes to step 670. Conversely, if A is greater than $\alpha 2$, then the presence of an occupied front-facing child safety seat is not possible, and control is passed to step 691 which causes the passenger sensing system to issue an "empty seat" command signal to the passenger restraint system. In step 660, the currents associated with paths r41 and r42 are compared with a maximum value M. If r41 and r42 are less than M, then control passes to step 694 which causes the passenger sensing system to issue an "occupied rear-facing child seat" command signal to the passenger restraint system. If r41 and r42 are equal to M, then control passes to step 693.

Step 670 determines whether the absolute value of r51–r52 is less than a fourth predetermined value $\beta 2$. Like value $\beta 1$, value $\beta 2$ represents a minimum expected difference between the currents at electrodes 51 and 52 in the presence of a child. If the absolute value of r51–r52 is less than $\beta 2$, then the passenger sensing system determines that a substantial mass (such as a child) is located adjacent the electrodes 51 and 52, and control passes to step 680. If the absolute value of r51–r52 is greater than $\beta 2$, then the passenger sensing system determines that a small object is present, and issues an "empty seat" command signal to the passenger restraint system (step 691).

In step 680, the currents associated with paths r51 and r52 are compared with a maximum value M. If r51 and r52 are less than M, then control passes to step 692 which causes the passenger sensing system to issue an "occupied front-facing child seat" command signal to the passenger restraint system. If r51 and r52 are equal to M, then control passes to step 693.

In step 693, all of the currents associated with paths r41, r42, r51 and r52 are equal to the maximum value M (that is, step 660 is "YES" and step 680 is "YES"), then the passenger sensing system to issue an "occupied seat" command signal to the passenger restraint system.

Figure 7:
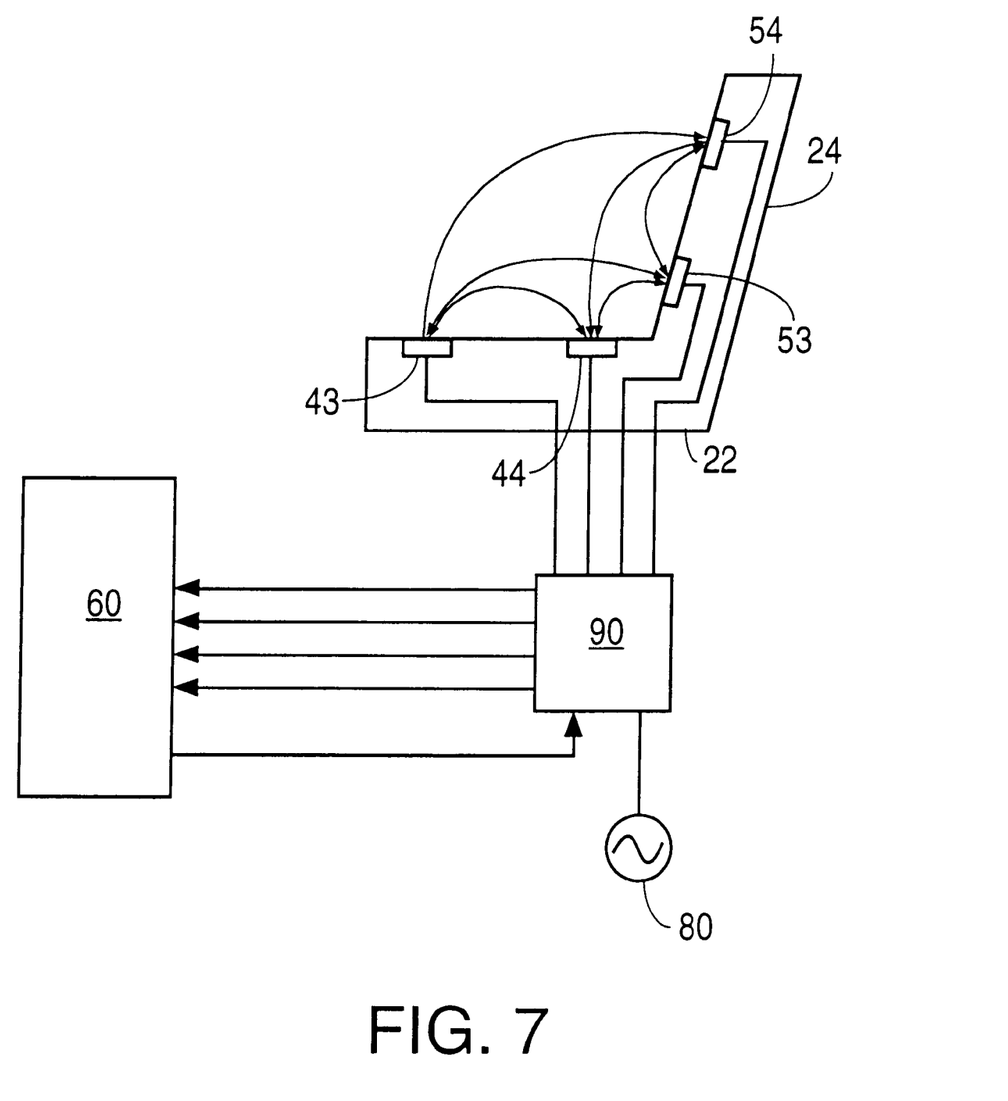
FIG. 7 shows a simplified diagram of a passenger sensing system in accordance with a third embodiment of the present invention.

FIG. 7 shows a simplified circuit diagram of a passenger sensing system in accordance with a third embodiment of the present invention. The passenger sensing system includes electrodes 43 and 44 mounted on the base portion 22 of the seat 20, and electrodes 53 and 54 mounted on the back support portion 24 of the seat 20. A switching circuit 90 is connected between the electrodes 43, 44, 53 and 54 and the signal source 80. The switching circuit 90 selectively connects one of the electrodes to the signal source 80 in response to a control signal received from controller 60. Further, the switching circuit is connected between the electrodes 43, 44, 53 and 54 and the controller 60 such that the switching circuit 90 connects one or more electrodes to the inputs of the controller 60 in response to control signals received from controller 60.

In accordance with the third embodiment, a selected electrode is connected to the signal source to transmit the electric field, and the remaining electrodes serve as receivers for detecting the electric field strength along selected paths. For example, when electrode 43 is connected by switching circuit 90 to the signal source 80, electrodes 44, 53 and 55 are connected through switching circuit 90 to the inputs of controller 60. Similarly, when electrode 44 is connected by switching circuit 90 to the signal source 80, and electrodes 43, 53 and 54 are connected through switching circuit 90 to the inputs of controller 60.

Also in accordance with the third embodiment, a total of $N(N-1)$ (where N is the number of electrodes) current path measurements are available for sensing passengers. For example, as shown in FIG. 7, the four electrodes provide twelve current path measurements (indicated as double-arrow lines extending between the electrodes 43, 44, 53 and 54). However, it is also possible to obtain measurements from the transmitting electrode, thereby increasing the total number of current measurements to $N^2$ (that is, in the example of FIG. 7, a total of sixteen current measurements) which may be used to sense the presence/position of passengers. Therefore, the passenger sensing system of the third embodiment provides an advantage over the first embodiment (shown in FIG. 1) in that additional currents (electric field paths) may be measured, thereby increasing the resolution of the passenger sensing process. This additional information allows for even more sophisticated algorithms than those shown in FIGS. 4 and 6, thereby improving the system's ability to avoid undesirable activation of an airbag when a rear-facing child safety seat is present.

Figure 8:
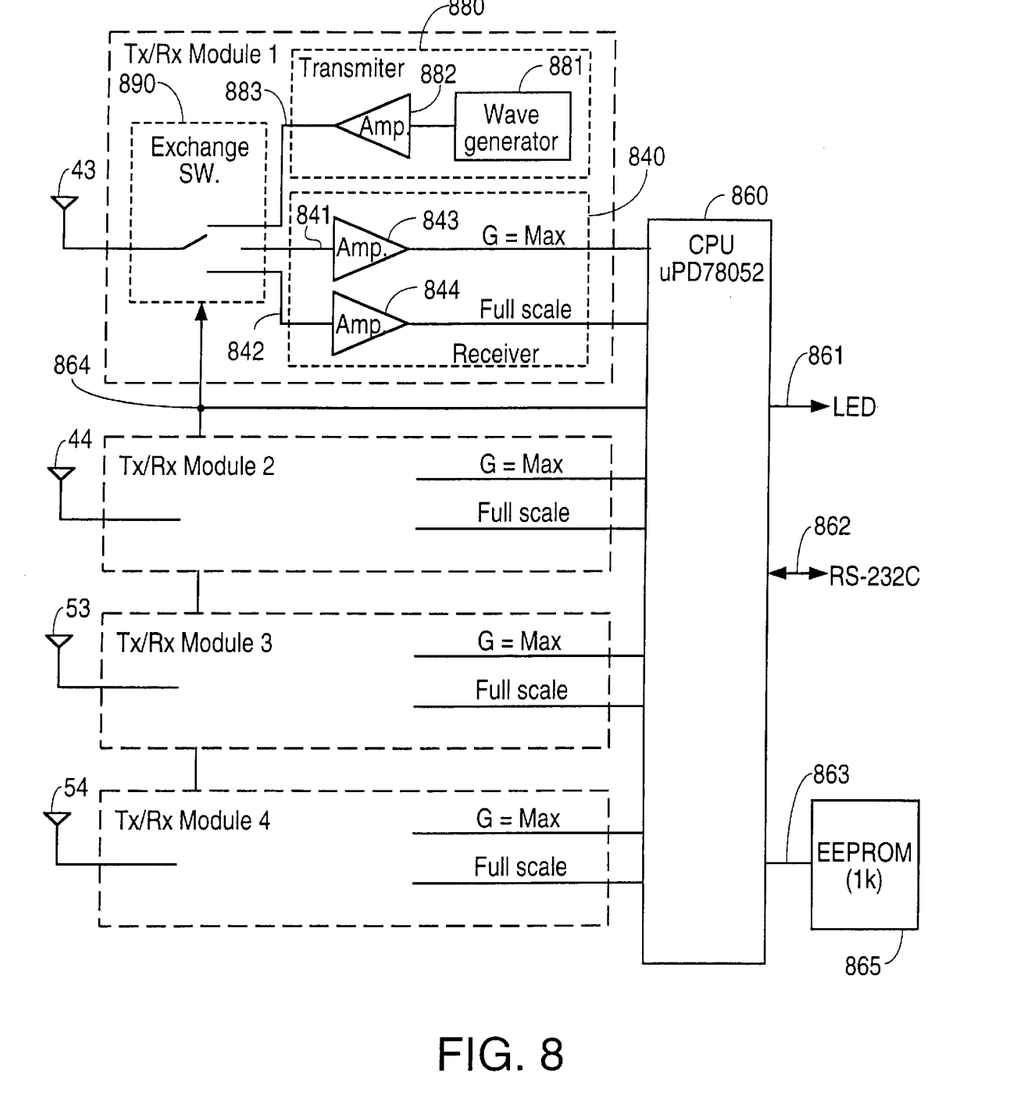
FIG. 8 shows a circuit diagram of a passenger sensing system in accordance with the third embodiment of the present invention.

FIG. 8 shows a circuit diagram of a preferred implementation of the passenger sensing system shown in FIG. 7. In the preferred passenger sensing system, the electrodes 43, 44, 53 and 54 are respectively connected to identical Tx/Rx modules 1 through 4. Reception currents are applied from the Tx/Rx modules to a controller 860. The controller 860 generates LED control signals on lines 861, communicates with the passenger restraint system (not shown) on lines 862, communicates with an EEPROM 865 on lines 863, and generates switch control signals on lines 864.

Tx/Rx module 1 includes a transmitter circuit 880, a receiver circuit 840 and a switch circuit 890. The transmitter circuit 880 includes a wave generator 881 connected to the switch circuit 890 through an amplifier 882. The receiver circuit 840 includes inputs 841 and 842 connected to the switch circuit 890. The inputs 841 and 842 are respectively connected to analog inputs of the controller 860 through amplifiers 843 and 844. Amplifier 843 amplifies the signal received at input 841 using a maximum gain ("G=Max") to provide a signal which is sensitive to small objects. Amplifier 844 amplifies the signal received at input 842 using based on a predetermined scale ("Full Scale") to provide a signal whose value is, for example, zero when no current is detected, and 255 when a maximum current is received at the corresponding electrode. In response to the switch control signals received on lines 864, the switching circuit connects either an output 883 of the transmitter circuit 880, or the inputs 841 and 842 of the receiver circuit 840 to the electrode 43. Although not shown, Tx/Rx modules 2 through 4 include substantially identical circuitry as that shown in Tx/Rx module 1 and operate in a similar manner.

The preferred controller 860 is a μPD78052CG(A) microprocessor manufactured by NEC Corporation of Tokyo, Japan, which incorporates an analog-to-digital (A/D) converter allowing direct input of the receiver currents (after amplification). Of course, the functions of controller 860 may be implemented by a digital processor used in conjunction with an external A/D converter.

As mentioned above, the controller 860 provides switching signals on lines 864 to the switching circuits 890 of each Tx/Rx module, thereby sequentially connecting the electrodes to its transmitter circuit 880, and connecting the remaining electrodes through their receiver circuits 840 to the analog inputs of the controller 860. The receiver currents are then converted into eight bit digital signals whose value is determined by the magnitude of the current (in proportion to a selected maximum current value). These eight bit digital signals are then subjected to mathematical operations and compared with stored data to determine whether the seat upon which electrodes 43, 44, 53 and 54 are mounted is empty (unoccupied), occupied by a normally-seated passenger, occupied by a child in a rear-facing child safety seat, or occupied by a child in a front-facing child safety seat. The stored data used to determine the occupancy of the seat (for example, comparison values such as $\alpha 1$, $\alpha 2$, $\beta 1$ and $\beta 2$ described in the second embodiment, above) is stored in EEPROM 865, which also stores instruction codes used by the controller 860. Once this determination is complete, the controller 860 generates passenger restraint command signals which are transmitted to a passenger restraint system (not shown) over RS-232 lines 862.

Although the present invention has been described in considerable detail with reference to certain preferred embodiments thereof, other embodiments are possible. For example, electrodes may be located, for example, on the door or dashboard of the vehicle to identify out-of-position passengers who may be injured by activation of an airbag. Therefore, the spirit and scope of the appended claims should not be limited to the description of the preferred embodiments contained herein.

We claim:

1. A vehicle passenger sensing system comprising:
   a signal generator for generating an alternating current signal;
   a first electrode mounted on the vehicle and connected to the signal generator, the first electrode generating an electric field in response to said alternating current signal;
   a second electrode mounted on the vehicle and spaced from the first electrode such that a first current is generated in the second electrode in response to the electric field and an object in the vehicle; and
   a controller for measuring the first current, and for generating a restraint system command signal in response to a magnitude of the first current.

2. The passenger sensing system according to claim 1, further comprising:
   a third electrode mounted on the vehicle and spaced from the first and second electrodes such that a second current is generated in the third electrode in response to the electric field and the object;
   wherein the controller generates the restraint system command signal in response to a comparison between the first current and the second current.

3. The passenger restraint system according to claim 2, wherein the first electrode comprises first and second metal layers separated by an insulating layer, the first metal layer being connected to a signal generator and the second metal layer being electrically isolated; and
   wherein each of the second and third electrodes comprises third and fourth metal layers separated by an insulation layer, the third metal layer being connected to the controller, and the fourth metal layer being connected to a ground potential.

4. The passenger restraint system according to claim 2, wherein the second electrode is mounted on a base portion of a seat, and the third electrode is mounted on a back support portion of the seat;
   wherein the object comprises an object in the seat.

5. The system of claim 1 wherein the object comprises a passenger in a seat of the vehicle, and wherein the restraint system command signal comprises an airbag command signal.

6. A passenger restraint system for a vehicle, the passenger restraint system including an airbag control circuit and a passenger sensing system, the airbag control circuit being de-activated in response to a restraint system command signal generated by the passenger sensing system, the passenger sensing system comprising:
   a signal generator for generating an alternating current signal;
   a first electrode mounted on the vehicle and connected to the signal generator, the first electrode generating an electric field in response to said alternating current signal;
   a second electrode mounted on the vehicle and spaced from the first electrode such that a first current is generated in the second electrode in response to the electric field and an object in the vehicle;
   a third electrode mounted on the vehicle and spaced from the first and second electrodes such that a second current is generated in the third electrode in response to the electric field and the object;
   a controller for generating the restraint system command signal in response to a predetermined relationship between the first current and the second current.

7. A passenger sensing system for a vehicle comprising:
   a plurality of electrodes mounted on the vehicle;
   a signal generator for generating an alternating current signal;
   a controller having an input terminal; and
   a switching circuit for selectively connecting a first electrode of the plurality of electrodes to the signal source such that the first electrode generates an electric field in response to said alternating current signal, and for selectively connecting a second electrode of the plurality of electrodes to the input terminal of the controller;
   wherein a portion of the electric field generates a current in the second electrode responsive to an object in the vehicle; and
   wherein the controller measures the current in the second electrode, and generates a restraint system command signal in response to a magnitude of the current.

8. The passenger sensing system according to claim 7, wherein each of the plurality of electrodes comprise first and second metal layers separated by an insulating layer.

9. The passenger sensing system according to claim 7 wherein the first electrode is mounted on a base portion of a seat, and the second electrode is mounted on a back support portion of the seat,
   wherein the passenger restraint system further comprises a third electrode mounted on the base portion of the seat and spaced from the first electrode, and a fourth electrode mounted on the back portion of the seat and spaced form the second electrode; and wherein the object comprises an object in the seat.

10. The system of claim 7 wherein the object comprises the passenger and the restraint system command signal comprises an airbag command signal.

11. A passenger sensing system for a vehicle comprising:
    a first electrode mounted on the vehicle, the first electrode being connected to a signal source such that the first electrode generates an electric field in response to an alternating current signal generated by said signal source;
    a second electrode mounted on the vehicle and spaced apart from the first electrode; and
    a controller including an input terminal connected to the second electrode, the controller generating a passenger restraint command signal in response to a current generated in the second electrode in response to the electric field generated by the first electrode and in response to an object in the vehicle;
    wherein the first and second electrodes comprise first and second metal layers separated by an insulating layer.

12. The passenger restraint system according to claim 11, wherein the first electrode comprises the first and second metal layers separated by the insulating layer, the first metal layer being connected to a signal generator and the second metal layer being electrically isolated; and
    wherein the second electrode comprises third and fourth metal layers separated by an insulation layer, the third metal layer being connected to the controller, and the fourth metal layer being connected to a ground potential.

13. The system of claim 11 wherein the object comprises the passenger and the passenger restraint command signal comprises an airbag command signal.

14. A method for sensing a passenger in a vehicle seat, the method comprising the steps of:

transmitting an electric field from a first electrode on the vehicle by applying to said first electrode an alternating current signal generated by a signal source;

measuring a first current induced by the electric field in a second electrode on the vehicle, the second electrode being spaced from the first electrode and the first current responsive to a characteristic of the passenger; and comparing the first current with a predetermined current value.

15. The method according to claim 14, further comprising:

measuring a second current induced by the electric field at a third location on the vehicle, the first, second and third locations being spaced from each other; and comparing the first and second currents.

16. The method according to claim 15, wherein the method further comprises:

transmitting an electric field form the second location on the vehicle;

measuring a strength of the electric field at the first location on the vehicle;

measuring a strength of the electric field at the third location on the vehicle; and comparing the electric field strengths measured at the first and third locations.

17. The method 14 wherein the characteristic is associated with a child in a child seat, and the comparing step comprises comparing the first current with the predetermined current value corresponding to a predetermined child in a child seat value.

18. A method for automatically de-activating an airbag located adjacent a vehicle seat when an occupied rear-facing child safety seat is mounted on the vehicle seat, the method comprising the steps of:

generating an electric field over the vehicle seat by applying to a transmitting electrode an alternating current signal generated by a signal source;

measuring a first plurality of currents induced by the electric field at a plurality of locations on a base portion of the vehicle seat;

measuring a second plurality of currents induced by the electric field at plurality of locations on a back support portion of the vehicle seat;

comparing an average of the first plurality of currents with an average of the second plurality of currents; and transmitting a de-activation command signal to an airbag control circuit when the average of the first plurality of currents is greater than the average of the second plurality of currents.

19. A method to claim 18, wherein the method further compromises:

calculating a difference between the first plurality of currents;

comparing the calculated difference with a predetermined value; and transmitting the de-activation signal only if the calculated difference is less than the predetermined value.

20. A method according to claim 18, wherein the method further compromises:

comparing each of the first plurality of currents with a maximum current value; and transmitting the de-activation signal only if each of the first plurality currents is less than the maximum current value.

* * * * *

UNITED STATES PATENT AND TRADEMARK OFFICE
CERTIFICATE OF CORRECTION

PATENT NO. : 5,948,031
DATED : September 7, 1999
INVENTOR(S) : Kazunori Jinno et al.

It is certified that error appears in the above-identified patent and that said Letters Patent is hereby corrected as shown below:

In column 1, line 11, please insert "," (comma) immediately after "1980's".

In column 1, line 25, please change "em ploys" to --employs--.

In claim 9, line 9, please change "form" to --from--.

In claim 16, line 3, please change "form" to --from--.

Signed and Sealed this

Twenty-fourth Day of April, 2001

Attest:

NICHOLAS P. GODICI

Attesting Officer      Acting Director of the United States Patent and Trademark Office